Feb. 14, 1939. W. I. BENDZ 2,147,422
AUTOMATIC CONTROL SYSTEM
Filed Nov. 6, 1937

WITNESSES:

INVENTOR
Waldemar I. Bendz.
BY
F. W. Lyle.
ATTORNEY

Patented Feb. 14, 1939

2,147,422

UNITED STATES PATENT OFFICE 2,147,422

AUTOMATIC CONTROL SYSTEM

Waldemar I. Bendz, Arlington, Mass., assignor to Westinghouse Electric & Manufacturing Company, East Pittsburgh, Pa., a corporation of Pennsylvania Application November 6, 1937, Serial No. 173,201

6 Claims. (Cl. 250—41.5)

My invention relates to automatic control systems, and it has particular relation to liquid level control.

In one of its more specific aspects, my invention is also designed to provide an improved apparatus for pumping sewage either solid or liquid from filtration tanks in which the solid matter is allowed to settle from the liquid matter.

An object of my invention is to provide an efficient apparatus for this purpose which will operate to start a motor mechanically connected with a pump when the liquid in the tank rises above a predetermined maximum level and will stop the motor when the water falls below a predetermined minimum level.

Another object of my invention is to start the operation of a pump at a predetermined time after the liquid in a container reaches a predetermined level and to stop the operation of the pump at a predetermined time after the liquid has reached a second predetermined level.

An ancillary object of my invention is to provide an efficient system for intermittently operating a motor or a valve.

More specifically stated, it is an object of my invention to eliminate as far as possible any unnecessary starting and stopping of a motor in general in any system in which it is subjected to intermittent loads and in particular in a system in which a pump is operated.

According to my invention, I provide a liquid level control system comprising two photo-electric devices, mounted at two different heights so that they can be energized by a suitable beam of radiant energy, preferably a light beam. A liquid level indicator is disposed to interrupt the light beam and thus deenergize the photo-electric circuits as the liquid rises to predetermined heights in the container or reservoir. The control circuit is so arranged that the pump starts to operate at a predetermined time after both photo-electric circuits have been deenergized and the pump stops a predetermined time after both photo-electric circuits have been energized. An advantage of the time delay is that it eliminates hunting or any unnecessary starting and stopping of the motor that may be caused by a too short interruption of the light beam, such as a disturbance on the surface of the liquid.

Figure 1:
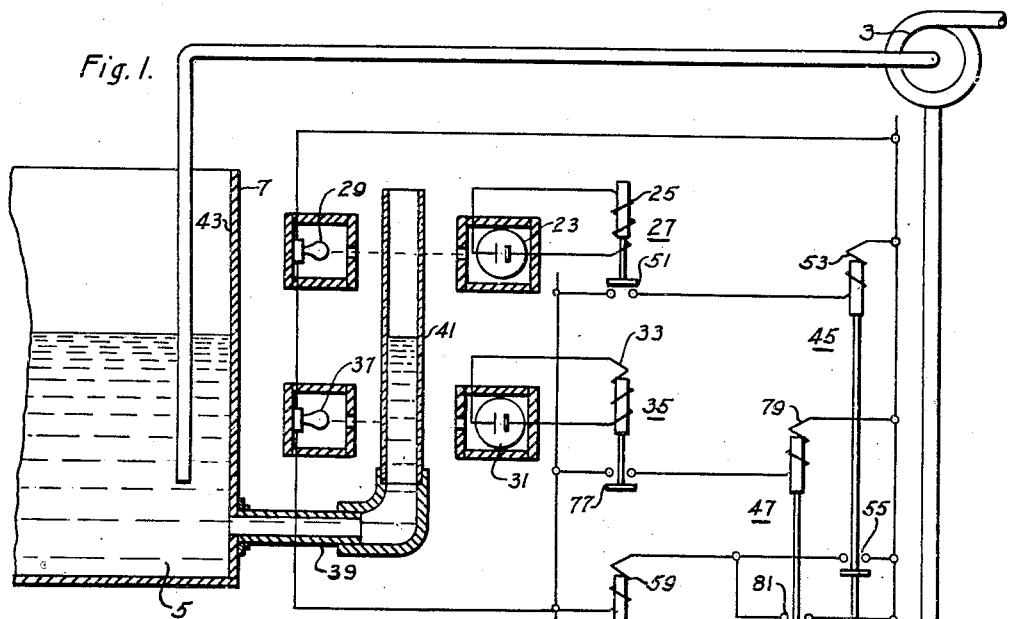
Figure 2:
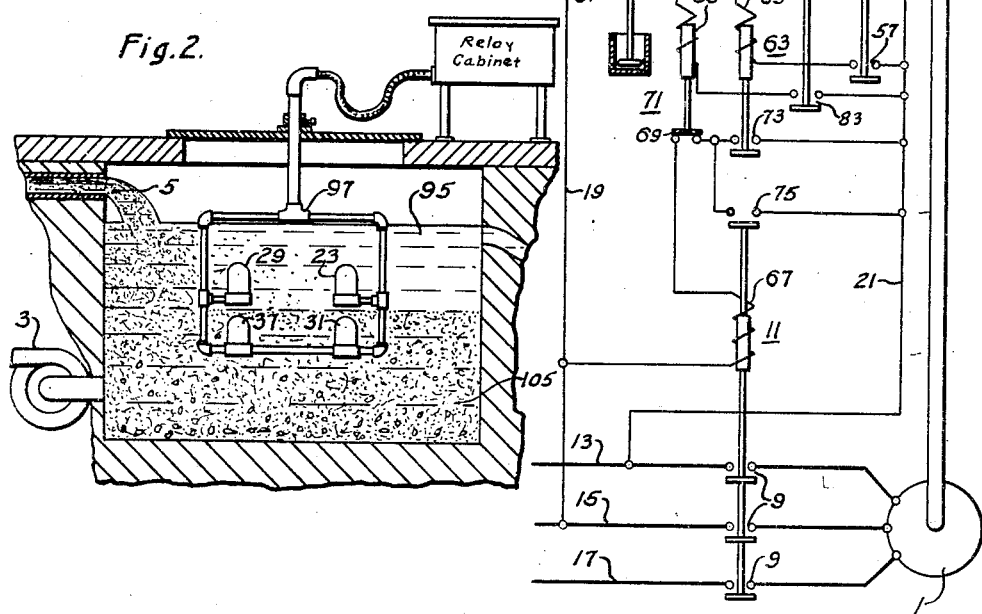

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which Figure 1 is a diagrammatic view showing the essential elements of a circuit connected in accordance with my invention; and Fig. 2 is a view in section showing the distinguishing feature of a modification of my invention.

The apparatus shown in the drawing comprises a motor 1 mechanically connected to a pump 3 used to eject a liquid 5 from a container 7. The motor 1 may be energized by closing a plurality of contacts 9 of a line switch 11. The motor is supplied from a suitable three-phase source of energy (not shown) through the usual line conductors 13, 15 and 17. Conductors 19 and 21 supply energy to the control circuit from the energized line conductors 15 and 13, respectively.

A photo-sensitive device 23 specifically shown as a photo-voltaic cell, is electrically connected to energize the operating coil 25 of a sensitive relay 27 when it in turn is supplied with radiant energy from a source 29, such as an incandescent lamp. Similarly, another photo-sensitive device 31 is connected to energize the operating coil 33 of a second sensitive relay 35 when it has been energized from another source of radiant energy 37. While a photo-voltaic cell is herein shown as used, it will be understood that any suitable photo-electric device, such as a photo-cell and an amplifier or a selenium cell may be used.

The container 7 is provided with a side arm 39, a portion 41 of which is transparent. The side arm is so connected to the remaining portion of the container that the liquid in it will be maintained at the same level as the liquid in the container. The side arm 39 is positioned between the light sources 29 and 37 and the photo-electric devices 23 and 31. The light beams are projected through the transparent portion of the side arm and may be intercepted by the liquid as it rises in the arm.

It is to be noted that my invention is in no way restricted to the side arm arrangement. The liquid 5 in the main portion of the container 7 may itself be used to actuate the photo-electric devices. In such a case, the container is provided with a transparent section in the wall 43 and the sources and photo-electric devices are properly located on both sides of the transparent portion, or the light sources and the photo-electric devices protected by suitable watertight housings mounted as an adjustable unit may be immersed directly in the liquid in the container. Also, under certain conditions, it may be desirable to use a float either in the container or in the side arm to intercept the light beams or to otherwise initiate the functioning of the control circuit.

The sensitive relays 25 and 33 function to actuate auxiliary relays 45 and 47, respectively, which in turn actuate a time delay relay 49. While the time delay relay shown in the drawing is of the dash-pot type, it is understood that a time delay relay of any well known type, may be utilized. For example, a motor operated timer may be used in lieu of the dash-pot relay. The time delay relay 49 is so connected in the circuit that it delays the starting and the stopping of the pump until it has remained energized for a predetermined time interval. Two time delay relays may be utilized for this purpose, one to delay the starting of the pump and the other to delay the stopping of the pump. It will also be understood that only one time delay relay may be used to delay either the starting of the pump alone or the stopping alone.

Assume that the liquid in the container has been rising for some time and that its level is such that the light beam from the upper source 29 passes through the transparent portion 41 of the side arm 39 of the container 7 and impinges on the upper photo-electric device 23 while the other light beam is intercepted by the liquid. In such a case, the upper sensitive relay 27 is energized and the lower sensitive relay 35 is deenergized and the system is in the condition shown in the drawing.

When the liquid rises high enough to intercept the light beam from the upper light source 29, the illumination impinged on the upper photo-electric device 23 is reduced and the first sensitive relay 27 is deenergized. Its contacts 51 close a circuit extending from the energized conductor 19 through the contacts 51 of the first sensitive relay 27, the operating coil 53 of the first auxiliary relay 45 to the other energized conductor 21. The operating coil 53 thereby functions to close the contacts 55 and 57 of the first auxiliary relay 45. The upper contacts 55 complete the circuit for energizing the operating coil 59 of the timing relay 49 which extends from the energized conductor 19 through operating coil 59 of timing relay 49 and the closed contacts 55 of the first auxiliary relay 45 to the other energized conductor 21. When the operating coil 59 has remained energized for an interval of time determined by the condition of the relay 49, the contacts 61 are closed.

Should the level of the liquid 5 in the side arm 39 drop to such an extent that the upper light beam again impinges on the upper photo-electric device 23 before the timing relay 49 functions, the first sensitive relay 27 would be reenergized, opening contacts 51 to deenergize the first auxiliary relay 45, thus opening the circuit to the operating coil 59 of the timing relay 49. To reestablish the circuit through the operating coil of the timing relay 49, it is necessary for the liquid to rise again to intercept the light beam impinged on the upper photo-electric device 23. The operation of the first sensitive relay 27, the first auxiliary relay 45, and the time delay relay 49 will thus be repeated as described hereinabove until the timing relay has been energized for a predetermined time interval. Any disturbance that would agitate the liquid in the container at this time may be sufficient to cause this undesirable operation. The timing relay will thus protect the line switch and the motor from any unnecessary operations.

The contacts 61 of the timing relay when it is finally energized establish a circuit for a starting relay 63 which extends from the energized conductor 19 through the closed contacts 61 of the timing relay 49, the operating coil 65 of the starting relay 63 and the previously closed lower contacts 57 of the first auxiliary relay 45 to the other energized conductor 21. This completes the circuit through the operating coil 67 of the line switch 11, thus closing the main contacts 9 to energize the motor 1 and start the operation of the pump 3. The circuit to the operating coil 67 of the line switch 11 extends from the energized conductor 19 through the operating coil 67, the normally closed contacts 69 of a stopping relay 71 and the closed contacts 73 of the starting relay 63 to the other energized conductor 21.

As the pump 3 operates to eject the liquid 5 from the container 7, the level of the liquid in the side arm 39 begins to fall. When the liquid no longer intercepts the upper light beam, the upper photo-electric device 23 functions to energize the first sensitive relay 27, thus deenergizing the first auxiliary relay 45 which deenergizes the time delay relay 49 and the starting relay 63. However, the line switch 11 remains in the energized condition because the closed auxiliary contacts 75 have established a holding circuit. The latter circuit may be traced as follows, from energized conductor 19 through operating coil 67, the normally closed contacts 69 of stopping relay 71 and the closed auxiliary contacts 75 of the line switch 11 to the other energized conductor 21. The level of the liquid 5 continues to fall as the pump 3 operates.

When the light beam from the lower light source 37 is no longer intercepted by the liquid in the transparent portion 41 of the side arm 39, the lower photo-electric device 31 becomes illuminated, thereby energizing the operating coil 33 of the second sensitive relay 35.

The second sensitive relay 35 functions to close contacts 77 to energize the operating coil 79 of the second auxiliary relay 47. This circuit extends from the energized conductor 19 through the closed contacts 77 of the second sensitive relay and the operating coil 79 of the second auxiliary relay 47, to the other energized conductor 21. The second auxiliary relay is then actuated to close the contacts 81 and 83. The upper contacts 81 of the second auxiliary relay 47 complete the circuit through the operating coil 59 of timing relay 49. This circuit extends from the energized conductor 19 through the operating coil 59 of timing relay 49 and the closed upper contacts 81 of the second auxiliary relay 47. After a predetermined time interval, timing relay functions to close contacts 61.

Before the timing relay 49 functions, it is possible that the liquid may be entering the container at substantially the same rate at which it is being ejected by the pump, or the liquid may suddenly enter the container at a faster rate. Should this happen, the liquid in the side arm 39 will rise to intercept the lower light beam thereby deenergizing the second auxiliary relay 35 which thus deenergizes the time delay relay 49 and prevents the operation of the stopping relay 71. A slight disturbance on the surface of the liquid in the container may also be sufficient to cause this operation.

When the level of the liquid again falls low enough for the light beam from the lower light source 37 to impinge on the lower photo-electric device 31 the second sensitive relay 35, the second auxiliary relay 47 and the timing relay 49 will function as described hereinabove. After the operating coil 59 of the timing relay 49 has been energized for a predetermined interval of time, the contacts 61 will close to complete the circuit through the operating coil 85 of the stopping relay 71.

This circuit extends from the energized conductor 19 through the contacts 61, the operating coil 85 and the closed lower contacts 83 of the second auxiliary relay 47 to the other energized conductor 21. The contacts 69 of the stopping relay 71 function to open the circuit through the operating coil 67 of the line switch 11. The line switch is then actuated to open the main contacts 9, thus deenergizing the motor 1 and stopping the operation of the pump 3. The circuit through the upper contacts 75 of the line switch 11 is also opened. The circuit through the operating coil of the line switch is thus maintained in the open condition until a predetermined time after the upper photo-electric device 23 has properly functioned.

When the pump is not operating, the level of the liquid will again begin to rise. As the liquid rises it will again interrupt the light beam from the lower light source 37 thus actuating the lower photo-electric device 31 to deenergize the second sensitive relay 35. The second sensitive relay 35 operates to open contacts 77 thus deenergizing the second auxiliary relay 47. The second auxiliary relay functions to open contacts 81 and 83 which open the circuit to operating coil 59 of timing relay 49 and the circuit to the operating coil 85 of stopping relay 71, respectively. Stopping relay 71 functions to close contacts 69 thus partially reestablishing the circuit through the operating coil 67 of the line switch 11. The circuit is so changed that it again assumes the condition shown in the drawing. The above-described cycle can be repeated indefinitely as the liquid continues to rise in the container.

The circuit arrangement explained hereinabove may be modified in various ways to accomplish somewhat the same result. For example if the photo-electric devices are capable of supplying sufficient power or their output is sufficiently amplified to directly operate more rugged relays similar to the starting relay 63 and the stopping relay 71 the auxiliary relays may be eliminated. Further, if the relays now controlled directly by the photo-electric devices are each provided with a time delay element, the separate time delay relay may be eliminated. Assuming that relays 27 and 35 are of the same rugged type as relay 63 and 85, the contacts 73 may be replaced in the control circuit by contacts 51, and operating coil 85 may be replaced by operating coil 33. With this change the operating coils 53, 59, 63, 79 and 85 and the contacts 55, 57, 61, 73, 77, 81 and 83 may be eliminated.

It is to be noted that while my invention has been shown herein as specifically applied to a pump control system for ejecting a liquid from a container, it will be evident to those skilled in the art that it has other applications. In general, it may be said that my invention can be applied to control the supply of power from a power source to any work circuit. As regards to other applications for pump control systems, my invention can be used to control a pump or valve used to control the supply of a liquid or any other suitable substance to a container. Another application may be to control the removal of sediment 105 from a settling tank 7 such as used in a sewage treatment plant and illustrated in Fig. 2. In this application the sewage 5 flows into the tank, the sediment or sludge 105 settles to the bottom of the tank while a substantially clear liquid 95 flows out at the top of the tank. For the most efficient operation, it is desirable to maintain the sediment 105 at a substantially constant height in the settling tank 7. The sediment or sludge at the bottom of the tank and the substantially clear liquid at the top of the tank are characterized by a marked difference in opacity. Because of this property of the liquids, the pump 3 may be controlled in the manner hereinabove described. The light sources 29 and 37 and the photo-electric devices 23 and 31 are mounted within the tank so that the light beams may be interrupted by the sediment in the bottom of the tank. The light sources 29 and 37 and the photo-electric devices 23 and 31, enclosed in watertight housings, are assembled as a unit preferably on a pipe structure 97 and mounted within the tank 7 so that the light beams may be interrupted by the sediment 105 in the bottom of the tank. The entire unit may be adjusted to the desired height in the tank or readily raised to the top of the tank for periodic inspection and cleaning. The connections from the light sources 29 and 37 and the photo-electric devices 23 and 31 to the relay cabinet are made through the pipe structure 97. The light beam from the upper light source 29 determines the high level of the sediment 105 and controls the starting of the pump 3, and the light beam from the lower light source 37 determines the low level of the sediment and controls the stopping of the pump 3. The time delay relay 49 is desirable because of the turbulence of the sludge. Turbulence may be caused by any disturbance at the surface of the sludge or sediment. For example when the pump is operating the movement of the sludge in the tank may at times cause enough disturbance to cloud up the liquid near the photo-sensitive devices and thus produce operation which would not otherwise be produced. The liquid emptied into the tank may cause a disturbance at the surface of the sludge or it may contain enough sedimentary matter to cloud up the liquid in the container. It is understood that the photo-sensitive devices may be so positioned with respect to the inlet and outlets of the container that they will be least affected by turbulence.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. Translating apparatus comprising a controller, a pair of photo-electric devices for controlling the operation of the said controller, means for varying the excitation of the said pair of photo-electric devices in a predetermined manner to actuate the said controller, a time delay relay cooperating with the said pair of photo-electric devices and the said controller to delay the actuation of the said controller a predetermined time after either of the said pair of photo-electric devices has functioned.

2. Translating apparatus comprising a controller, a pair of photo-electric devices for controlling the operation of the said controller, means for varying excitation of the said pair of photo-electric devices in a predetermined manner to actuate the said controller, a time delay relay cooperating with the said pair of photo-electric devices and the said controller to delay the actuation of the said controller a predetermined time after either of the said pair of photo-electric devices has functioned, means for rendering either of the said pair of photo-electric devices ineffective to actuate the said controller after it has functioned in a predetermined manner, and means for maintaining the said photo-electric device ineffective to actuate the said controller until after the other of the said pair of photo-electric devices has functioned to actuate the said controller, means for deenergizing the said time delay relay after it has properly functioned in cooperation with either of the said pair of photo-electric devices, and means for rendering it effective to function in cooperation with the other of the said pair of photo-electric devices.

3. A system for controlling the application of power from a power source to a work circuit in response to a condition that changes and persists as changed for relatively long intervals of time, fluctuating changes of said condition being simultaneously superimposed on the said long changes, comprising means for coupling and uncoupling the said power source to and from the said work circuit, a first device sensitive to radiant energy, a second device sensitive to radiant energy, means alternately responsive to the said first and the said second devices to actuate the said coupling and uncoupling means a predetermined time, shorter than the said long intervals of time and substantially longer than the said short intervals, after either the said first device or the said second device has functioned for a predetermined condition.

4. Translating apparatus comprising a controller, a pair of devices that are actuated in response to the presence of a physical disturbance for controlling the operation of the said controller, means for varying the excitation of the said pair of devices in a predetermined manner to actuate the said controller, a timing means cooperating with the said pair of devices and the said controller to delay the actuation of the said controller a predetermined time after either of the said pair of devices has functioned.

5. In combination a first and second set of selective contacts to be closed in response to a first physical condition, a set of timing contacts actuated a predetermined time after the said first set of selective contacts has functioned, a set of starting contacts to be actuated in response to the said timing contacts and the said second set of selective contacts, a translating device actuated in a first predetermined manner by the said set of starting contacts, a set of holding contacts associated with the said translating device in such a manner that they maintain the translating device in its newly acquired condition regardless of any change in the said first physical condition, a third and a fourth set of contacts to be closed in response to a second-physical condition, the said set of timing contacts being actuated a predetermined time after the said third set of selective contacts has functioned, a set of stopping contacts to be actuated in response to the said timing contacts and the said fourth set of selective contacts to actuate the said translating device in a second predetermined manner, and thus to actuate the said holding contacts in such a manner that the said translating device is maintained in its newly acquired condition regardless of any change in the second physical condition.

6. In combination a first set and a second set of contact means disposed to be actuated in response to a first predetermined physical condition, a third set and a fourth set of contact means disposed to be actuated in response to a second predetermined physical condition, a fifth set of contact means connected in circuit relation with the said second set and the said fourth set of contact means and disposed to be actuated a predetermined time after the said first set of contact means has been actuated or a predetermined time after the said third set of contact means has been actuated, a sixth set of contact means disposed to be actuated after the said second set and the said fifth set of contact means have been actuated, a seventh set of contact means disposed to be actuated after the said fourth set and the said fifth set of contact means have been actuated, a translating device disposed to be actuated in a first predetermined manner by the said sixth set of contacts and disposed to be actuated in a second predetermined manner by the said seventh set of contacts and an eighth set of contact means connected in circuit relation with the said sixth set and the said seventh set of contact means and disposed to maintain the first predetermined manner of actuation of the translating device regardless of any change in the said first physical condition.

WALDEMAR I. BENDZ.